United States Patent
Hornung

(10) Patent No.: US 10,942,139 B2
(45) Date of Patent: Mar. 9, 2021

(54) OPERATION METHOD FOR FLOW SENSOR DEVICE

(71) Applicant: Sensirion AG, Stäfa (CH)

(72) Inventor: Mark Hornung, Stäfa (CH)

(73) Assignee: SENSIRION AG, Stafa (CH)

(*) Notice: Subject to any disclaimer, the term of this patent is extended or adjusted under 35 U.S.C. 154(b) by 237 days.

(21) Appl. No.: 16/023,947

(22) Filed: Jun. 29, 2018

(65) Prior Publication Data

US 2019/0003993 A1 Jan. 3, 2019

(30) Foreign Application Priority Data

Jun. 30, 2017 (EP) .................................. 17178905

(51) Int. Cl.
*G01N 25/18* (2006.01)
*G01F 5/00* (2006.01)
(Continued)

(52) U.S. Cl.
CPC ............... *G01N 25/18* (2013.01); *G01F 1/68* (2013.01); *G01F 1/684* (2013.01); *G01F 5/00* (2013.01);
(Continued)

(58) Field of Classification Search
CPC .. G01N 25/18; G01F 1/68; G01F 5/00; G01F 15/04
See application file for complete search history.

(56) References Cited

U.S. PATENT DOCUMENTS

| 4,210,016 A | 7/1980 | Peter et al. |
| 4,280,360 A | 7/1981 | Kobayashi et al. |

(Continued)

FOREIGN PATENT DOCUMENTS

| AU | 67191/00 A1 | 4/2001 |
| DE | 41 18 781 A1 | 12/1992 |

(Continued)

OTHER PUBLICATIONS

Aronniemi, M. "Optical CO2 module with chip-on-board MEMS components and injection-molded plastic optics." Presentation, Oct. 7, 2013, Semicon(R) Europa2013, Dresden, Germany (16 pgs.).
(Continued)

*Primary Examiner* — Jamel E Williams
(74) *Attorney, Agent, or Firm* — Foley & Lardner LLP

(57) ABSTRACT

Method of operating a flow sensor device (10) with a first sensor arrangement (11) for measuring a flow (F) of a fluid (g) and a further first fluid property ($p_1$), and with a second sensor arrangement (12) for measuring a further second fluid property ($p_2$); said method comprising the steps of operating said flow sensor device (10) for determining said further first fluid property ($p_1$) by means of said first sensor arrangement (11), operating said flow sensor device (10) for determining said further second fluid property ($p_2$) by means of said second sensor arrangement (12), comparing said further first fluid property ($p_1$) and further second fluid property ($p_2$) and producing a comparison result (R), and monitoring said comparison result and producing a fault signal (FS) in case of a fault state. The present invention relates to such a sensor device.

24 Claims, 2 Drawing Sheets

(51) Int. Cl.
*G01F 1/684* (2006.01)
*G01F 15/04* (2006.01)
*G01F 1/68* (2006.01)
*G01N 25/00* (2006.01)
*G01F 25/00* (2006.01)

(52) U.S. Cl.
CPC ............ *G01F 15/04* (2013.01); *G01N 25/005* (2013.01); *G01F 25/0053* (2013.01)

(56) References Cited

U.S. PATENT DOCUMENTS

| | | | |
|---|---|---|---|
| 4,384,792 A | 5/1983 | Sommers et al. | |
| 4,651,564 A * | 3/1987 | Johnson | G01F 1/6845 219/538 |
| 4,653,321 A | 3/1987 | Cunningham et al. | |
| 4,870,859 A | 10/1989 | Twerdochlib | |
| 4,885,938 A * | 12/1989 | Higashi | G01F 1/684 73/204.18 |
| 4,944,035 A | 7/1990 | Aagardl et al. | |
| 5,050,429 A | 9/1991 | Nishimoto et al. | |
| 5,235,844 A * | 8/1993 | Bonne | G01N 29/036 374/36 |
| 5,426,975 A | 6/1995 | Stark | |
| 5,486,107 A | 1/1996 | Bonne | |
| 5,515,295 A | 5/1996 | Wang | |
| 5,599,503 A | 2/1997 | Manz et al. | |
| 5,705,745 A | 1/1998 | Treutler et al. | |
| 5,918,279 A | 6/1999 | Hecht et al. | |
| 5,922,970 A | 7/1999 | Ohle | |
| 5,980,102 A | 11/1999 | Stulen et al. | |
| 6,159,739 A | 12/2000 | Weigl et al. | |
| 6,169,965 B1 * | 1/2001 | Kubisiak | G01F 1/6842 702/136 |
| 6,272,919 B1 * | 8/2001 | Huiberts | G01F 1/6842 73/204.18 |
| 6,417,837 B1 | 7/2002 | Baba | |
| 6,502,459 B1 * | 1/2003 | Bonne | G01F 1/6845 73/170.11 |
| 6,536,273 B2 * | 3/2003 | Schrittenlacher | G01F 1/684 73/204.11 |
| 6,550,324 B1 | 4/2003 | Mayer et al. | |
| 6,634,214 B1 | 10/2003 | Thurston et al. | |
| 6,763,710 B2 | 7/2004 | Mayer et al. | |
| 6,871,537 B1 * | 3/2005 | Gehman | G01N 25/18 73/204.26 |
| 7,490,511 B2 | 2/2009 | Mayer et al. | |
| 7,644,613 B2 | 1/2010 | Mayer et al. | |
| 7,685,875 B2 | 3/2010 | Zimmermann et al. | |
| 7,905,140 B2 | 3/2011 | Kanne | |
| 8,011,240 B2 | 9/2011 | Von Waldkirch et al. | |
| 8,257,655 B2 | 9/2012 | Martin | |
| 8,941,826 B2 | 1/2015 | Nawaz et al. | |
| 9,170,136 B2 * | 10/2015 | Berkcan | G01F 1/3209 |
| 2002/0100416 A1 | 8/2002 | Sun et al. | |
| 2003/0159505 A1 | 8/2003 | Konzelmann et al. | |
| 2003/0235926 A1 | 12/2003 | Knollenberg et al. | |
| 2004/0099057 A1 | 5/2004 | Hornung et al. | |
| 2004/0195531 A1 | 10/2004 | Rahmouni et al. | |
| 2005/0183500 A1 | 8/2005 | Kanouda et al. | |
| 2005/0189018 A1 | 9/2005 | Brodeur et al. | |
| 2007/0114421 A1 | 5/2007 | Maehlich et al. | |
| 2007/0131282 A1 | 6/2007 | Mohammed et al. | |
| 2007/0137297 A1 * | 6/2007 | Gehman | G01F 1/684 73/204.26 |
| 2008/0019877 A1 | 1/2008 | Martin | |
| 2008/0091306 A1 | 4/2008 | Shajii et al. | |
| 2008/0184769 A1 | 8/2008 | McKinney | |
| 2008/0289411 A1 | 11/2008 | Schrag et al. | |
| 2009/0000396 A1 | 1/2009 | Kawanishi et al. | |
| 2009/0039249 A1 | 2/2009 | Wang et al. | |
| 2010/0080262 A1 | 4/2010 | McDonald | |
| 2010/0103137 A1 | 4/2010 | Ciesla et al. | |
| 2010/0151916 A1 | 6/2010 | Baek et al. | |
| 2010/0154510 A1 | 6/2010 | Viens et al. | |
| 2011/0007023 A1 | 1/2011 | Abrahamsson et al. | |
| 2011/0126611 A1 | 6/2011 | Bierl et al. | |
| 2011/0247696 A1 | 10/2011 | Zolock et al. | |
| 2011/0257898 A1 * | 10/2011 | Ooishi | G01N 25/18 702/23 |
| 2012/0174992 A1 | 7/2012 | Shajii et al. | |
| 2012/0242607 A1 | 9/2012 | Ciesla et al. | |
| 2012/0260727 A1 | 10/2012 | Kinkade, Jr. | |
| 2013/0092256 A1 | 4/2013 | Yasuda et al. | |
| 2013/0104996 A1 | 5/2013 | Oh et al. | |
| 2013/0257817 A1 | 10/2013 | Yliaho | |
| 2014/0070101 A1 | 3/2014 | Matsushima et al. | |
| 2014/0158211 A1 | 6/2014 | Ding et al. | |
| 2014/0273193 A1 | 9/2014 | Li | |
| 2014/0299204 A1 | 10/2014 | Somani | |
| 2014/0326064 A1 | 11/2014 | Nakano et al. | |
| 2014/0343875 A1 | 11/2014 | Spyropoulos et al. | |
| 2014/0345363 A1 | 11/2014 | Pretre et al. | |
| 2016/0077218 A1 | 3/2016 | Loi et al. | |
| 2016/0131512 A1 * | 5/2016 | Shirai | G01F 1/6965 702/47 |
| 2016/0138394 A1 | 5/2016 | Brooks et al. | |
| 2016/0138951 A1 | 5/2016 | Pretre | |
| 2016/0334349 A1 * | 11/2016 | Lotters | G01K 17/12 |
| 2016/0341330 A1 | 11/2016 | Sneh | |
| 2018/0003622 A1 | 1/2018 | Fujisawa et al. | |
| 2019/0120151 A1 * | 4/2019 | Dane | G01N 33/2829 |

FOREIGN PATENT DOCUMENTS

| | | |
|---|---|---|
| DE | 10129300 A1 | 2/2002 |
| DE | 10122039 B4 | 11/2002 |
| EP | 0 468 793 A2 | 1/1992 |
| EP | 0 554 095 A2 | 8/1993 |
| EP | 0 670 034 A1 | 9/1995 |
| EP | 0 890 828 A1 | 1/1999 |
| EP | 1 046 864 A2 | 10/2000 |
| EP | 1 065 475 A2 | 1/2001 |
| EP | 1 265 068 A1 | 12/2002 |
| EP | 1 426 740 A2 | 10/2003 |
| EP | 1 396 705 A2 | 3/2004 |
| EP | 1 411 355 A1 | 4/2004 |
| EP | 1 443 314 A2 | 8/2004 |
| EP | 1 612 521 A1 | 1/2006 |
| EP | 1 840 535 A1 | 10/2007 |
| EP | 1 840 536 A1 | 10/2007 |
| EP | 1 867 961 A1 | 12/2007 |
| EP | 1 965 179 A1 | 9/2008 |
| EP | 2 015 056 A1 | 1/2009 |
| EP | 2 107 347 A1 | 10/2009 |
| EP | 2 175 246 A1 | 4/2010 |
| EP | 2 365 411 A1 | 9/2011 |
| EP | 2 527 779 A2 | 11/2012 |
| EP | 2 574 918 A1 | 4/2013 |
| EP | 2 806 271 A1 | 11/2014 |
| EP | 2 808 609 A1 | 12/2014 |
| EP | 2 824 432 A2 | 1/2015 |
| EP | 2 871 456 A1 | 5/2015 |
| EP | 2 887 057 A1 | 6/2015 |
| EP | 2 894 464 A1 | 7/2015 |
| EP | 2 960 754 A2 | 12/2015 |
| EP | 3 029 429 A1 | 6/2016 |
| EP | 3 037 791 A1 | 6/2016 |
| EP | 3 048 429 A1 | 7/2016 |
| EP | 3 048 432 A1 | 7/2016 |
| EP | 3 118 711 A1 | 1/2017 |
| EP | 3 130 895 A1 | 2/2017 |
| EP | 3 144 663 A1 | 3/2017 |
| EP | 3 153 854 A1 | 4/2017 |
| EP | 3 258 241 A2 | 12/2017 |
| EP | 3 348 969 A1 | 7/2018 |
| GB | 30405 A | 5/1910 |
| JP | 2002-243517 A | 8/2002 |
| WO | WO-82/04120 A1 | 11/1982 |
| WO | WO-93/08457 A1 | 4/1993 |
| WO | WO-99/34198 A2 | 7/1999 |
| WO | WO-00/37895 A1 | 6/2000 |
| WO | WO-01/18500 A1 | 3/2001 |

(56) References Cited

FOREIGN PATENT DOCUMENTS

| WO | WO-01/81872 A1 | 11/2001 |
| WO | WO-01/84087 A1 | 11/2001 |
| WO | WO-01/98736 A1 | 12/2001 |
| WO | WO-02/093114 A1 | 11/2002 |
| WO | WO-2012/021999 A1 | 2/2012 |
| WO | WO-2015/075278 A1 | 5/2015 |

OTHER PUBLICATIONS

Mayer, F. et al. "Scaling of Thermal CMOS Gas Flow Microsensors: Experiment and Simulation." IEEE, 1996, pp. 116-121.

Sensirion AG, "Environmental Sensing", Environmental Sensors Product Announcement, 2018 (9 pgs.).

Sensirion AG, SFC4000 Ultra-Fast CMOSens(R) Mass Flow Controller for Gases, Product Information v.2.6, Jan. 2012, 15 pgs.

Extended European Search Report dated Jan. 5, 2018 in related European application No. 17178905.0 (6 pgs.).

\* cited by examiner

OPERATION METHOD FOR FLOW SENSOR DEVICE

CROSS REFERENCE TO RELATED APPLICATIONS

This application claims priority to European Appl. No. 17178905.0, filed Jun. 30, 2017; the contents of which are incorporated by reference herein in their entirety.

TECHNICAL FIELD

The present invention relates to a method of operating a flow sensor device for measuring a fluid flow, to a sensor device implementing said method, and to a computer program product embodying said method.

PRIOR ART

It is known to use more than one sensor unit in flow meters, i.e. flow sensor devices, for measuring a fluid flow.

U.S. Pat. No. 4,885,938 and WO 01/18500 A1 teach to use a flow sensor arrangement and a further sensor for determining a fluid parameter, wherein the fluid parameter measurement by means of the further sensor is used for correcting the flow measurement performed by means of the flow sensor arrangement.

EP 1 065 475 teaches a flow meter with a flow sensor arrangement and a further temperature sensor, wherein the further temperature sensor reading is used for correcting a flow sensor arrangement measurement.

U.S. Pat. No. 4,944,035 A teaches to measure with a sensor a thermal conductivity and specific heat.

SUMMARY OF THE INVENTION

In a first aspect, it is an object of the present invention to provide a more reliable operating method for a flow sensor device.

According thereto, a method of operating a flow sensor device for measuring a flow of a fluid is suggested, wherein said flow sensor device comprises:
  at least one first sensor arrangement configured and arranged for measuring both a flow of said fluid and at least one further first fluid property;
  at least one second sensor arrangement in contact with said fluid and configured and arranged for measuring at least one further second fluid property; wherein at least one of said at least one further first fluid property corresponds to one of said at least one further second fluid property such as to enable a comparison between said properties by means of said flow sensor device.

The above-cited object is achieved in that said method comprises the steps of:
  a) to operate said flow sensor device for determining said flow of the fluid and said at least one further first fluid property by means of said first sensor arrangement;
  b) to operate said flow sensor device for determining said at least one further second fluid property by means of said second sensor arrangement;
  c) to compare at least one of said at least one further measured first fluid property and at least one of said at least one further second fluid property with one another and to produce a comparison result;
  d) to monitor said comparison result and to produce a fault signal if said comparison result deviates from a predetermined value or is outside a predetermined value range.

In the context of the present invention, the term "fluid" may be understood as any substance with the ability to flow under shear stress. Preferred fluids are gases and liquids or a combination thereof. Natural gas is a particularly preferred fluid.

In the context of the present invention, the term "sensor arrangement" may be understood as a unit with a sensor, the sensor being configured and arranged to measure a fluid property.

In the context of the present invention, the term "fluid property" may be understood as a property, in particular a thermal property, of the fluid subject to the flow measurement.

In the context of the present invention, the term "corresponding fluid property" may be understood as parameter that may be compared to another fluid parameter, either directly or after additional calculations, e.g. by a correlation analysis, preferably executed by the flow sensor device. Preferably, said fluid property is, in the range of typical flow rates, independent of the actual fluid flow.

In the context of the present invention, the language "to monitor the comparison result" may be understood as a continual or repetitive capturing of the comparison result, preferably in an automatic manner.

It is also conceivable that the comparison is, alternatively or additionally, triggered by a further device, by an external event, or by a user. Said repetitive capturing is done preferably with a frequency (or rate) that corresponds to the lower frequency (rate) of measurements of the first and second sensor arrangements or that is lower than said lower frequency.

Preferably, the first sensor arrangement is measuring more often than the second sensor arrangements.

The frequency may depend on previous comparison results and/or on a trend in the comparison result. If, for example, the comparison result does not indicate a fault situation but, over the course of previous measurements, approaches a fault situation, the monitoring frequency, as well as the comparison frequency, may be adjusted accordingly by the flow sensor device. Accordingly, a memory device may be used to store the previous and actual measurements for such a trend analysis, preferably performed in appropriately equipped means comprised by the flow sensor device. In some embodiments, the first and second sensor arrangements measure at the same frequency and a comparison result is produced for every pair of measurements.

The present invention is based on the insight that an operating procedure for a flow sensor device is more reliable if at least two sensor arrangements are deployed wherein the first sensor arrangement is configured and arranged for measuring a fluid flow while the first and second sensor arrangements are both configured and arranged to measure a further first and second fluid property, respectively, that may be compared to one another as part of the operation method according to invention. The comparison between measurement results of said first and second sensor arrangements is made in order to detect a possible fault state or malfunctioning of the flow sensor device, in particular of the first flow sensor arrangement. In the present invention, the correct functioning of the first sensor arrangement is checked by the independent first and second sensor arrangements that measure each at least one fluid property, wherein the fluid property measurements are compared for monitoring the functioning state of the device and for indicating a possible malfunction.

In some embodiments, the further first fluid property and the further second fluid property are the same property of the fluid. This allows a direct comparison between the fluid properties with minimal processing power.

If the two measurement results differ by more than the predetermined value or is outside the predetermined range, the fault signal is generated. The predetermined value may be, for example, 0.1% to 15%. The predetermined value may correspond to a value of 2 to 10 times the typical measurement error of the respective sensor arrangement.

In some embodiments, not a difference but a ratio between the further first and the further second fluid property is determined and monitored.

In some embodiments, the further first and second fluid properties are not the same but correspond to one another. They are connected to one another by a specific law. They may be correlated or anti-correlated. A correlation analysis may be performed for comparing the at least two measurements.

In some embodiments, the further first fluid property and/or the further second fluid property are at least one parameter selected from the group consisting of:
the thermal conductivity of said fluid,
the volumetric specific heat of said fluid, and
the thermal diffusivity of said fluid.

In the International System of Units (SI), the thermal conductivity is usually denoted as A and is given in W/(m·K), the volumetric specific heat is determined from the product of the specific heat capacity of said fluid, usually denoted as $c_p$ and given in J/(kg·K), times the density of said fluid, usually denoted as $\rho$ and given in kg/m³, i.e. the volumetric specific heat of said fluid can be defined as $c_p \cdot \rho$, and the thermal diffusivity is usually denoted as $\alpha$ and is given in m²/s, wherein $$\alpha = \frac{\lambda}{c_p \cdot \rho}.$$

The thermal conductivity $\lambda$ may be measured as taught in EP 1 426 740 A2.

The volumetric specific heat $(c_p \cdot \rho)$ and the thermal diffusivity a may be measured as taught in WO 01/18500 A1.

The thermal conductivity, the volumetric specific heat, the specific heat capacity, the density and the thermal diffusivity are in each case well-known physical quantities, wherein their particular units of measurement can be different depending on the particular system of measurement in use. In this context it should be understood that any units of measurement associated with these physical quantities independent of the system of measurement such as the above-mentioned International System of Units (SI), the Centimetre-Gram-Second System of Units (CGS) or the Imperial and US customary measurement systems, for example, as well as their conversion into other units of measurement based on a physical relationship are within the scope of the present application. Likewise, also unit prefixes prepending to the units of measurement in order to indicate multiples or fractions of the units of measurement are within the scope. Thus, statements made herein with regard to a physical quantity in one of the systems of measurement or with a unit prefix apply mutatis mutandis to said physical quantity in another system of measurement or without or with a different unit prefix, and vice versa.

It is particularly preferred that the first sensor arrangement is a flow sensor arrangement. It may be a thermal sensor arrangements as disclosed, for example, in WO 01/18500 A1. The flow (i.e. the flow rate) is determined as taught, for example in WO 01/18500 A1.

Preferably, the second sensor arrangement is a thermal sensor such as disclosed, for example, in U.S. Pat. No. 5,050,429 A.

In some embodiments, the second sensor arrangement may be a flow sensor as well, preferably of the same design as the first sensor arrangement. In some embodiments, said at least one further first fluid property and said at least one further second fluid property are both the thermal conductivity of said fluid, wherein, by means of the second sensor arrangement, furthermore the thermal diffusivity of said fluid is determined and used for correcting the flow measurement of the first sensor arrangement. Accordingly, two further second properties are determined with the second sensor arrangement, one being use for direct comparison (thermal conductivity) and one being used for flow correction purposes (thermal diffusivity).

In some embodiments of the method according to invention, the first sensor arrangement is located at a first position in said fluid and said second sensor arrangement is arranged at a second position in said fluid. The first and second location are chosen such that the flow of said fluid at said second location is reduced with respect to the flow at said first location during intended measurements with the flow sensor device. The reduction may be at least 50% or at least 75% or at least 90% or at least 95% or at least 99% or 100%.

In many cases, the fluid flow carries debris, dust, dirt particles, or other components that may be deposited onto and disturb the first and/or second sensor arrangements. The deposition rate is generally lower, if the flow is reduced as less deposition material is carried to the sensor. Accordingly, it is preferred to locate the second sensor arrangement, which does not necessarily need to be in the flow as it may be used for only measure the second further parameter, in a region of decreased flow. It is particularly preferred to place the second sensor arrangement in a dead volume, where the fluid to be measured enters such that the further second parameter may be used according to invention, but where substantially no flow is present during the flow measurement, i.e. where the fluid remains static. The placing of said second sensor arrangement in the dead volume further reduces any unwanted deposition.

In the case of such an arrangement, the first fluid parameter does not depend on the flow but only on the fluid at typical flow rates in flow sensor devices. Preferably, the first and second fluid parameter are the same, thus, both preferably do not depend on the flow, such as, for example, a density or thermal conductivity of the fluid.

In some embodiments, the comparison result may be simply a difference between the first further property measurement by means of the first sensor arrangement and the second further measurement by means of the second sensor arrangement. The difference may be positive or negative. In more complex arrangements, however, the first signal of the first sensor arrangement indicating the first fluid parameter and the second signal from the second sensor arrangement indicating the second fluid parameter may be compared within the meaning of the present invention by assessing their mutual correlation. This correlation between the at least two measurements may be done by means of a lookup table or a correlation function and suitable hard- and software components. The lookup table or correlation function may be determined during calibration measurements with predetermined fluids and/or may be based on models with standard values for the fluid used. It is conceivable that the flow sensor device is used to determine the fluid as taught, for example, in WO 2015 075278 A1. The comparison, in some case the correlation analysis, may then be based on the fluid determination result.

The comparison according to invention may preferably be done automatically and/or preferably in a repetitive manner. The comparison may also be triggered by a further device connected to the flow sensor device and/or a user.

In some embodiments, in case of a fault signal, the flow sensor device is operated to execute a counter measure. The counter measure is designed to avoid that possibly wrong first sensor arrangement measurements are used without noticing the potential problem. Such a counter measure may be at least one measure selected from the group consisting of:
  correcting the flow signal of the first sensor arrangement by using the measurement of the second sensor arrangement,
  shutting down the flow sensor device,
  outputting the fault signal to a user or further device, and
  recalibrating the first sensor arrangement based on said comparison result.

A correction of the first sensor arrangement measurement is taught, for example, in EP 1 065 475 A2.

In some preferred embodiments, the first sensor arrangement is a flow sensor arrangement that measures the flow and, additionally, the first fluid property, wherein the first fluid property is the thermal conductivity. The second sensor arrangement also measures the thermal conductivity as the as the at least one further second property for a direct comparison. Moreover, the second sensor arrangement also measures the thermal diffusivity as taught in WO 01/18500 A1 which is used for correcting the flow measurements done by the first sensor arrangement.

In some embodiments, the flow sensor device is operated such that the first and second sensor arrangements measure with different measurement frequency. Preferably, the second sensor arrangement measures less frequent than the first sensor arrangement. Such embodiments allow for reducing the energy consumption and data flow of the flow sensor device.

In some preferred embodiments, the first sensor arrangement measures in a first interval in a range of from 0.5 second to 30 seconds, most preferably in a range of from 1 seconds to 5 seconds, most preferably 2 seconds; and the second sensor arrangement measures in a second interval in a range of from 30 minutes to 24 hours, most preferably in a range of from 2 hour to 10 hours.

Preferably, said fault signal is provided to a user or to a further device.

In a further aspect, it is another object of the present invention to provide a more reliable flow sensor device.

This object is achieved by a flow sensor device which implements the method according to invention. According thereto, a flow sensor device is suggested that comprises a flow sensor device for measuring a flow of a fluid comprising:
  at least one first sensor arrangement configured and arranged for measuring a flow of a fluid and at least one further first fluid property;
  at least one second sensor arrangement in contact with said fluid and configured and arranged for measuring at least one further second fluid property; wherein at least one of said at least one further first fluid property corresponds to one of said at least one further second fluid property such as to enable a comparison by means of said flow sensor device;

wherein said flow sensor device is configured to perform the steps of:
  to operate said flow sensor device for determining said flow and said at least one further first fluid property by means of said first sensor arrangement;
  to operate said flow sensor device for determining said at least one further second fluid property by means of said second sensor arrangement;
  to compare said one of said at least one further first fluid property with said corresponding one of said at least one further second fluid property and to produce a comparison result;
  to monitor said comparison result and to produce a fault signal if said comparison result deviates from a predetermined value or is outside a predetermined value range.

The flow sensor device with respect to the placement of the first and second sensor arrangements may be designed, for example, as disclosed in WO 01/18500 A1.

In some embodiments of the device according to invention, said further first fluid property and said further second fluid property are the same property of said fluid, preferably do not depend on the actual flow for typical flow measurements; and/or
  wherein said further first fluid property and/or said further second fluid property are at least one parameter selected from the group consisting of:
  the thermal conductivity of said fluid,
  the volumetric specific heat of said fluid, and
  the thermal diffusivity of said fluid.

As already outlined above, in the International System of Units (SI) the thermal conductivity of said fluid can be denoted as $\lambda$ and is given in W/(m·K); the volumetric specific heat is determined from the product of the specific heat capacity of said fluid, usually denoted as and given in J/(kg·K), times the density of said fluid, usually denoted as p and given in kg/m$^3$; and
the thermal diffusivity is usually denoted as $\lambda$ and is given in m$^2$/s, wherein $$\alpha = \frac{\lambda}{c_p \cdot \rho}.$$

However, again, the particular units of measurement can be different depending on the particular system of measurement in use.

In some embodiments of the device according to invention, said first and second sensor arrangements are of a different design with respect to one another. Preferably, one of said first and second sensor arrangements is of membrane-based sensor design while the other is of bridge-based sensor design. In other embodiments, said first and second sensor arrangements are of the same design.

In some embodiments, said first and second sensor arrangements measure at different measurement frequencies, the second sensor arrangement measuring less frequent than the first sensor arrangement as outlined above in the context of the method according to invention.

In some embodiments of the device according to invention, said first sensor arrangement is located at a first position in said flow sensor device and said second sensor arrangement is arranged at a second position in said flow sensor device. Said first and second location may be chosen such that said flow of said fluid at said second location is reduced with respect to said flow at said first location during intended measurements with said flow sensor device. The reduction may be at least 50% or at least 75% or at least 90% or at least 95% or at least 99% or 100% (dead volume). Preferably, said second location is in a dead volume, said second location being such that said fluid is static at said second location during intended measurements with said flow sensor device. The reduced or avoided flow has the advantages as outlined above in context with the method according to invention, i.e. reduction of deposition and degradation.

In some embodiments of the device according to invention, said flow sensor device comprises at least one support for supporting the at least one first and second sensor arrangements. The support(s) may be a printed circuit board. In some embodiments, said first and second sensor arrangements are both arranged in or on the same support while both sensor arrangements may be provided on the same or on different chips; this allows a compact and efficient design. In some other embodiments, the first and second sensor arrangements are arranged on separate supports and on separate chips.

Preferably, the first and second sensor arrangements are both arranged on one and the same chip. The chip may be provided on a silicon substrate or on any other suitable substrate.

In some embodiments of the device according to invention, said flow sensor device has a bypass channel as known from the prior art. The flow measurement by means of the first sensor arrangement then may take place in said bypass channel. Said first and second sensor arrangements may then be both arranged in said bypass channel. This further reduces the exposure of the sensor arrangement to deposition of material which would impair the measurement quality of the sensors.

In some preferred embodiments, the second sensor may be arranged in a dead volume extending from the bypass channel. In other words, the dead volume may be provided in a blind hole extending from the bypass channel. This offers extra degradation protection to the second sensor arrangement.

Preferably, the second sensor arrangement is arranged upstream of the first sensor arrangement. In other embodiments, the second sensor arrangement may be arranged downstream of the first sensor arrangement.

In some preferred embodiments, the flow sensor device is configured such that said at least one further first fluid property and said at least one further second fluid property are both the thermal conductivity of said fluid, wherein said flow sensor device is further configured to determine with the second sensor arrangement the thermal diffusivity of said fluid and to use the thermal diffusivity measurement for correcting the flow measurement of the first sensor arrangement.

In yet another aspect, the present invention relates to a computer program product. Said computer program product for operating flow sensor device comprises a computer readable storage medium with computer program code that, when carried out in a control device of said flow sensor device, preferably according to the present invention, causes said control device to carry out the method according to the present invention.

The computer program code that, when carried out in a control device of a gas sensor according to the present invention, causes the control device to carry out the method of the present invention. The computer program can be provided in source code, in machine-executable code, or in any intermediate form of code like object code. It can be provided as a computer program product on a computer-readable medium in tangible form, e.g. on a CD-ROM or on a Flash ROM memory element, or it can be made available in the form of a network-accessible medium for download from one or more remote servers through a network.

In a further aspect, the present invention, in particular the method according to invention, the flow sensor device according to invention, or the computer program product according to invention, may be used for measuring a fluid flow of said fluid, in particular a flow rate of a fluid.

In summary, the present invention relates to a method of operating a flow sensor device, said device comprising a first sensor arrangement for measuring a flow of a fluid and a further first fluid property, and comprising a second sensor arrangement for measuring at least one further second fluid property; said method comprising the steps of operating said flow sensor device for determining said further first fluid property by means of said first sensor arrangement, operating said flow sensor device for determining said further second fluid property by means of said second sensor arrangement, comparing said further first fluid property with said further second fluid property and to produce a comparison result, and monitoring said comparison result and producing a fault signal if said comparison result indicates a fault state. The present invention also relates to such a sensor device and a computer program product implementing such a method.

These aspects will be better understood when considered with the description of the preferred embodiments below. It is to be understood, however, that aspects and features as taught herein may be combined with one another without departing from the scope of the invention and further embodiments may be formed with parts of or all of the features of the embodiments as described herein.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
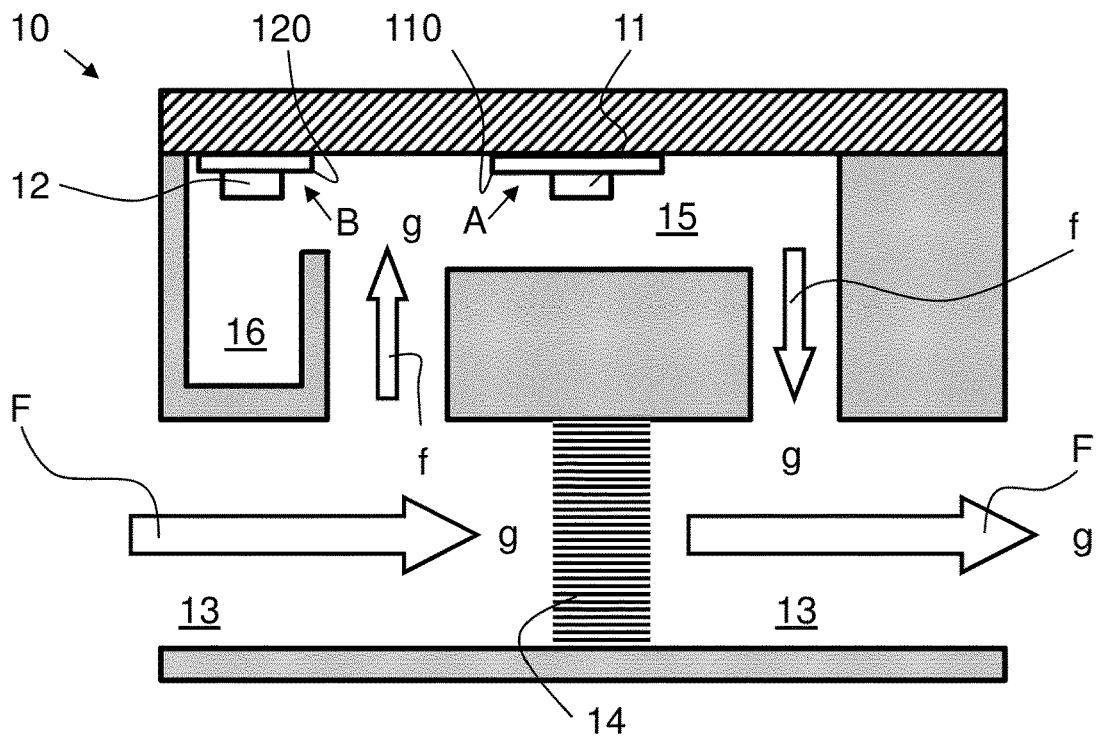
FIG. 1 shows an embodiment of the flow sensor device according to the present invention.

FIG. 1 shows a flow sensor device 10 according to an embodiment of the present invention for measuring a flow F of a fluid g passing through said flow sensor device 10. The flow sensor device 10 defines a flow channel 13 with a flow restrictor 14 and a bypass channel 15 branching off and merging back with the flow channel 13. According to the presented design, a bypass flow f is measured by means of sensors, wherein said bypass flow f is correlated to the fluid flow F by means of geometrical considerations as known from the prior art. It is to be understood, however, that different flow device architectures may be used that do not rely on bypass channels.

In the bypass channel 15, at a location A, is arranged a first sensor arrangement 11 configured for measuring a flow F of the fluid g by measuring said bypass flow f and rescaling the result to find the fluid flow F through the main flow channel 13, as known from the prior art.

Furthermore, said first sensor arrangement 11 is configured to measure at least one further first fluid property $p_1$.

The first sensor arrangement 11 is, in this embodiment, a thermal flow sensor as known, for example, from WO 01/18500 A1. The thermal flow sensor arrangement 11 may be a membrane-based or a bridge-based design.

Furthermore, the device 10 comprises, at location B in the bypass channel 15, a dead volume 16 defined by a blind hole in the bypass channel 15 which is, however, fluidly connected to the bypass channel 15 such that a passing fluid g enters in the volume 16 when the channels 13, 15 are flooded by the fluid g.

In this dead volume 16, the fluid flow is generally greatly reduced. As a consequence, the second sensor arrangement 12 is less exposed to deposition of the deposition material carried in the flow and therefore measures longer with good precision, in other words, it degrades slower. The deposition material may be debris, dirt particles or it may also refer to fluids that tend to create a layer on the fluid guiding structure.

In the embodiment described here, also the second sensor arrangement 12 is a thermal sensor device. In some preferred embodiments, the first sensor arrangement 11 is of membrane-based design (see, for example, EP 1 840 535 A1), while the second sensor arrangement 12 is of a bridge-based design (see, for example, U.S. Pat. No. 5,050,429 A).

In some other embodiments, the first and second flow sensor arrangements 11, 12 have the same design.

Said second sensor arrangement 12 is configured to measure at least one further second fluid property $p_2$. The fluid g may thus be denoted: $g(p_1, p_2)$.

The first and second sensor arrangements 11, 12 are arranged on first and second supports 110, 120. The sensor arrangements may be integrated via a chip based on a silicon substrate any other suitable semiconductor of dielectric substrate. The supports 110, 120 are arranged in the bypass channel 15 as shown in FIG. 1. It is, however, also conceivable to use separate chips on a single support or a single chip with both sensor arrangements on the same support.

Consequently, as further parameters $p_1$ and $p_2$ may be chosen, one or more parameters of the group comprising the thermal conductivity $\lambda$ of said fluid g, the volumetric specific heat $(c_p \cdot p)$ of said fluid g, and the thermal diffusivity $\alpha$ of said fluid g. Here, $\lambda$ is given in W/(m·K);
$c_p$ is the specific heat capacity of said fluid g given in J/(kg·K);
$\rho$ is the density of said fluid g given in kg/m³; and $$\alpha = \frac{\lambda}{c_p \cdot \rho}$$

is given in m²/s.

Preferably, parameters $p_1$ and $p_2$ are the same parameter measured in the same fluid g at different locations A and B, respectively.

Said flow sensor device 10 is further configured such that said first and second sensor arrangements 11, 12 measure with different measurement frequency. More specifically, said second sensor arrangement 12 measures less frequent, i.e. at rate $r_2$, than said first sensor arrangement 11 which measures at rate $r_2$. The first sensor arrangement 11 provides the flow data at the desired interval, while the second sensor arrangement 12 measures 10 times to 1000 times, e.g. 100 times, or less frequent. The rate of the second sensor measurements may be adapted to catch typical fault states. If, for example, a fluid g is measured that is heavily polluted, a fault state may occur more often than if a rather clean fluid is guided through the sensor device 10. Accordingly, the measurement rates $r_1$, $r_2$ of the first and second sensor arrangements 11, 12 may be adapted to the specific purpose of the sensor device 10. The skilled person may adjust these rates. It is also conceivable that the user may adjust these rates according to the actual needs or according to experience.

In some examples, e.g. for natural gas measurements, said first sensor arrangement 11 measures in a first interval in a range of from 0.5 second (i.e. at $r_1$=2 Hz) to 30 seconds (i.e. at $r_1$=⅓₀ Hz), preferably in a range of from 1 seconds (i.e. at $r_1$=1 Hz) to 5 seconds (i.e. at $r_1$=⅕ Hz), most preferably 2 seconds (i.e. at $r_1$=½ Hz); and said second sensor arrangement 12 measures in a second interval in a range of from 30 minutes (i.e. at $r_2$=1/1800 Hz) to 24 hours (i.e. at $r_2$=1/86400 Hz), preferably in a range of from 2 hour to 10 hours.

The comparison between first and second parameters $p_1$ and $p_2$ may be done at a rate $r_3 \leq r_2$. Preferably but not necessarily, each $p_2$ measurement triggers a comparison event, the latter may leasing to the generation of a fault signal S in case of a fault situation.

Furthermore, said device 10 is configured to output said fault signal S to a user or a further device as a warning signal, e.g. for indicating the need for maintenance.

In case of a fault signal S, said flow sensor device 10 is configured to execute a counter measure said counter measure being at least one measure selected from the group consisting of:
  correcting a flow signal of said first sensor arrangement 11 by using said measurement of said second sensor arrangement 12,
  shutting down said flow sensor device 10,
  outputting the fault signal S to a user (for example as an acoustic and/or optical warning signal) or further device (for example a display), and
  recalibrating said first sensor arrangement 11 based on said comparison result R.

Preferably, the flow sensor device 10 is configured such that the first sensor arrangement 11 is measuring more often than the second flow sensor arrangement 12. Generally, a rate at which typical applications require flow readings from the flow sensor device is considerably higher than the rate at which a sensor arrangement that is providing the flow readings may be monitored for detecting possible fault conditions. Such a scheme may be implemented in the flow sensor device 10 according to the present invention.

Figure 2:
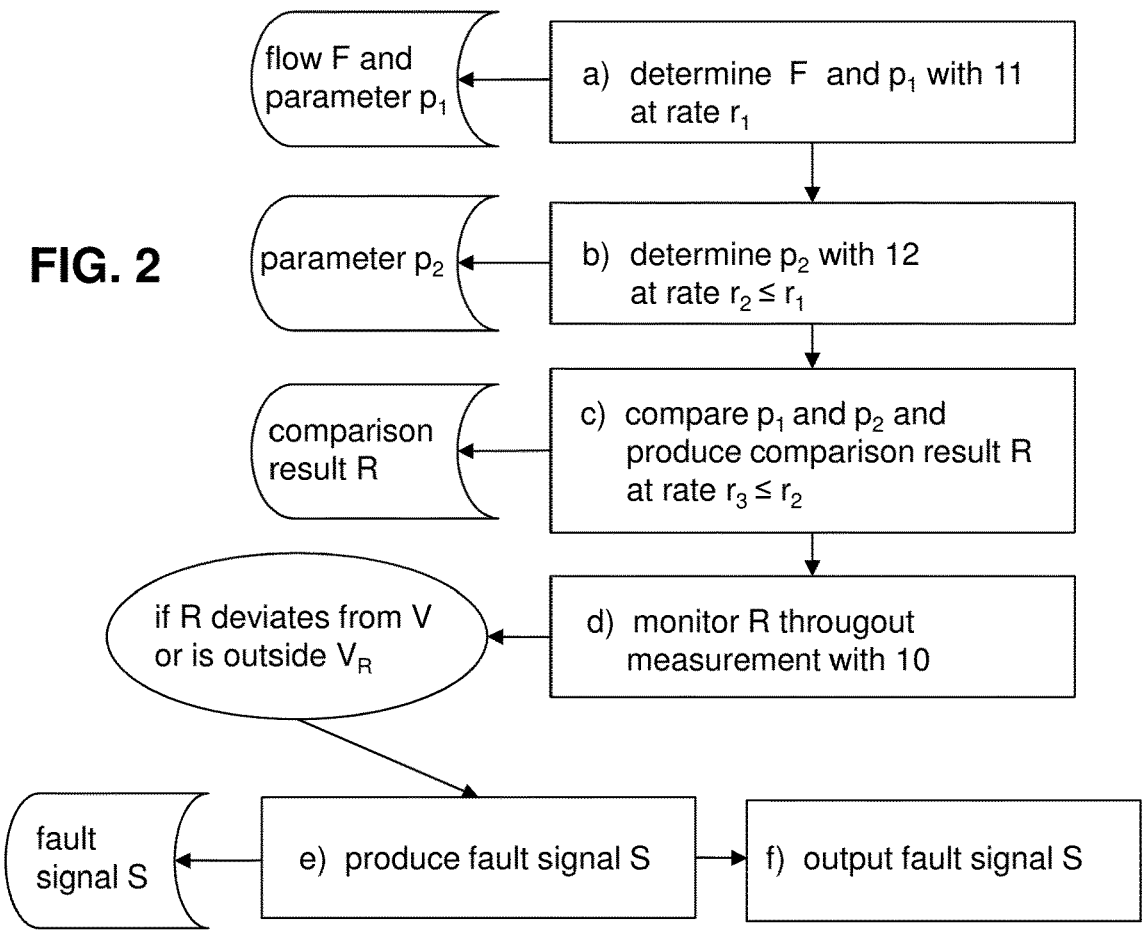
FIG. 2 shows a flow diagram of an embodiment of the method according to invention.

A preferred embodiment of the method according to invention is now described with reference to FIG. 2. FIG. 2 shows a block diagram of an embodiment of the method according to the present invention. The flow sensor device 10 implements the method according to the present invention, the method comprising the steps of:

a) to operate said flow sensor device 10 for determining a flow F of fluid g and said at least one further first fluid property $p_1$ by means of said first sensor arrangement 11. It is to be understood, that each measurement may be done once or several times such that the value or measurement is an average value or average measurement.

b) to operate said flow sensor device 10 for determining said at least one further second fluid property $p_2$ by means of said second sensor arrangement 12.

c) to compare said one of said at least one further first fluid property $p_1$ with said corresponding one of said at least one further second fluid property $p_2$ and to produce a comparison result R;

d) to monitor said comparison result R and to produce a fault signal S if said comparison result R deviates from a predetermined value V or is outside a predetermined value range $V_R$.

Preferably, the measurements rate of the first flow sensor arrangement 11 is done more frequently, as required by the specific measurement set up; it may be in the sub-second, seconds or minute range. The measurement rate of the second flow sensor arrangement 12 is preferably lower than the measurement rate of the first flow sensor arrangement 11; it may be in the minute or hour range. This helps to save energy.

Figure 3:
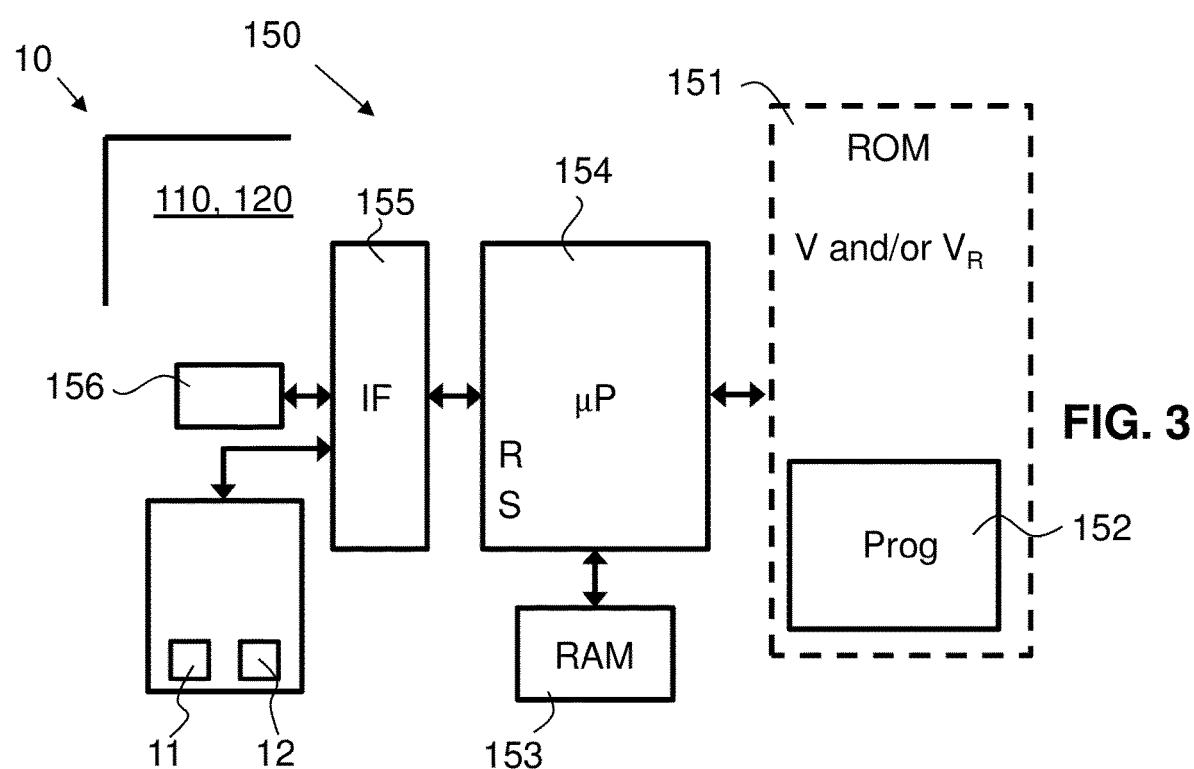
FIG. 3 shows an embodiment of a computer program product according to the present invention.

FIG. 3 shows a simplified block diagram of a computer program product for the flow sensor device 10 as described herein. The integrated circuitry 150 comprises a processor unit (CPU, μP) 154, a non-volatile (e.g. a flash ROM) memory 151, and a volatile (RAM) memory 153. The processor 154 communicates with the memory modules 151, 153. The non-volatile memory 151 stores, inter alia, received or generated signals, as well as a machine-executable program code 152 for execution in the processor 154. Via a data interface 155, the processor 154 may communicate with various peripherals, including, for example and depending on the application, the first and second sensor arrangements 11, 12, the control device, i.e. the processor unit 154, and/or a user interface 156. The user interface 156 may include, e.g., at least one of a network interface for interfacing with an external input/output device, a dedicated input device such as a keyboard and/or mouse for inputting, e.g., a threshold value T or a measurement scheme or the like, and a dedicated output device, such as, e.g., a screen for displaying information.

While there are disclosed and described presently preferred embodiments of the invention, it is to be understood that the invention is not limited thereto but may be otherwise variously embodied and practiced within the scope of the invention. In particular, features or feature combinations of different embodiments described herein may be combined with one another or may replace one another.

The invention claimed is:

1. A method of operating a flow sensor device, said flow sensor device comprising:
   at least one first sensor arrangement configured and arranged for measuring a flow of a fluid and at least one further first fluid property;
   at least one second sensor arrangement in contact with said fluid and configured and arranged for measuring at least one further second fluid property, wherein at least one of said at least one further first fluid property corresponds to one of said at least one further second fluid property such as to enable a comparison with said flow sensor device;
   said method comprising the steps of:
   a) determining said flow of the fluid and said at least one further first fluid property with said first sensor arrangement;
   b) determining said at least one further second fluid property with said second sensor arrangement;
   c) comparing at least one of said at least one further first fluid property and at least one of said at least one further second fluid property with one another and producing a comparison result; and
   d) monitoring said comparison result and producing a fault signal if said comparison result deviates from a predetermined value or is outside a predetermined value range.

2. The method according to claim 1, wherein said further first fluid property and said further second fluid property are the same property of said fluid.

3. The method according to claim 1, wherein at least one of said further first fluid property and said further second fluid property are at least one parameter selected from the group consisting of:
   a thermal conductivity of said fluid,
   a volumetric specific heat of said fluid, and
   a thermal diffusivity of said fluid.

4. The method according to claim 1, wherein said at least one further first fluid property and said at least one further second fluid property are both a thermal conductivity of said fluid,
   wherein the method further comprises a step of
   with the second sensor arrangement, determining a thermal diffusivity of said fluid and using the thermal diffusivity of said fluid for correcting the flow measurement of the first sensor arrangement.

5. The method according to claim 1,
   wherein said first sensor arrangement is located at a first position in said fluid and said second sensor arrangement is arranged at a second position in said fluid,
   wherein said first and second positions are chosen such that said flow of said fluid at said second position is reduced with respect to said flow at said first position during intended measurements with the flow sensor device.

6. The method according to claim 2, wherein said comparison result is a difference or a ratio between a value or value range of the first further property measurement with the first sensor arrangement and a value or value range of the second further measurement with the second sensor arrangement.

7. The method according to claim 1, wherein, when a fault signal is produced, said flow sensor device is operated to execute a counter measure said counter measure being at least one measure selected from the group consisting of:
   correcting a flow signal of said first sensor arrangement by using said measurement of said second sensor arrangement,
   shutting down said flow sensor device,
   outputting the fault signal to a user or further device, and
   recalibrating said first sensor arrangement based on said comparison result.

8. The method according to claim 1, wherein said flow sensor device is operated such that said first and second sensor arrangements are configured to measure with different measurement frequencies.

9. The method according to claim 1, comprising a step of outputting said fault signal to a user or a further device.

10. A flow sensor device for measuring a flow of a fluid comprising:
    at least one first sensor arrangement configured and arranged for measuring a flow of a fluid and at least one further first fluid property;
    at least one second sensor arrangement in contact with said fluid and configured and arranged for measuring at least one further second fluid property wherein at least one of said at least one further first fluid property corresponds to one of said at least one further second fluid property such as to enable a comparison with said flow sensor device;

wherein said flow sensor device is configured to perform the steps of:
a) determining said flow of said fluid and said at least one further first fluid property with said first sensor arrangement;
b) determining said at least one further second fluid property with said second sensor arrangement;
c) comparing said one of said at least one further first fluid property with said corresponding one of said at least one further second fluid property and producing a comparison result; and
d) monitoring said comparison result and producing a fault signal if said comparison result deviates from a predetermined value or is outside a predetermined value range.

11. The flow sensor device according to claim 10, wherein at least one of said further first fluid property and said further second fluid property are the same property of said fluid, and
at least one of said further first fluid property and said further second fluid property are at least one parameter selected from the group consisting of:
a thermal conductivity of said fluid,
a volumetric specific heat of said fluid, and
a thermal diffusivity of said fluid;
wherein the thermal conductivity is given in W/(m·K);
wherein the volumetric specific heat is a product of a specific heat capacity of said fluid given in J/(kg·K) and a density of said fluid given in kg/m$^3$, and
wherein the thermal diffusivity is given in m$^2$/s.

12. The flow sensor device according to claim 10, wherein said first and second sensor arrangements are of a different design with respect to one another.

13. The flow sensor device according to claim 10,
wherein said first sensor arrangement is located at a first position in said flow sensor device and said second sensor arrangement is arranged at a second position in said flow sensor device,
wherein said first and second positions are chosen such that said flow of said fluid at said second position is reduced with respect to said flow at said first position during intended measurements with said flow sensor device.

14. The flow sensor device according to claim 12, wherein said flow sensor device comprises at least one support, said first and second sensor arrangements being both arranged in or on said at least one support.

15. The flow sensor device according to claim 12,
wherein said flow sensor device has a bypass channel,
wherein said first and second sensor arrangements are both arranged in said bypass channel.

16. The flow sensor device according to claim 12,
wherein said flow sensor device is configured such that said at least one further first fluid property and said at least one further second fluid property are both a thermal conductivity of said fluid,
wherein said flow sensor device is further configured to determine with the second sensor arrangement a thermal diffusivity of said fluid and to use the thermal diffusivity measurement for correcting the flow measurement of the first sensor arrangement.

17. A non-transitory computer readable medium storing a computer program product for operating a flow sensor device, said computer program product comprising a computer readable storage medium with computer program code that, when carried out in a control device of said flow sensor device causes said control device to carry out the method according to claim 1.

18. A flow sensor device for measuring a flow of a fluid comprising:
at least one first sensor arrangement configured and arranged for measuring a flow of a fluid and at least one further first fluid property;
at least one second sensor arrangement in contact with said fluid and configured and arranged for measuring at least one further second fluid property wherein at least one of said at least one further first fluid property corresponds to one of said at least one further second fluid property such as to enable a comparison with said flow sensor device;
wherein said flow sensor device is configured to perform the steps of:
a) determining said flow of said fluid and said at least one further first fluid property with said first sensor arrangement;
b) determining said at least one further second fluid property with said second sensor arrangement;
c) comparing said one of said at least one further first fluid property with said corresponding one of said at least one further second fluid property and producing a comparison result; and
d) monitoring said comparison result and producing a fault signal if said comparison result deviates from a predetermined value or is outside a predetermined value range, and
wherein said flow sensor device is operated such that said first and second sensor arrangements are configured to measure with different measurement frequencies.

19. The method according to claim 3,
wherein the thermal conductivity is given in W/(m·K),
wherein the volumetric specific heat is a product of a specific heat capacity of said fluid given in J/(kg·K) and a density of said fluid given in kg/m$^3$, and
wherein the thermal diffusivity is given in m$^2$/s.

20. The method according to claim 5, wherein said second position is chosen such that said fluid is static at location during intended measurements with the flow sensor device.

21. The method according to claim 8, wherein
at least one of said second sensor arrangement measures less frequently than said first sensor arrangement, said first sensor arrangement measures in a first interval in a range of from 1 second to 30 seconds, and
said second sensor arrangement measures in a second interval in a range of from 30 minutes to 10 hours.

22. The flow sensor device according to claim 12, wherein
at least one of said at least one first sensor arrangement or at least one second sensor arrangement is of a membrane-based sensor design while another one of said at least one first sensor arrangement or at least one second sensor arrangement is of a bridge-based sensor design, and
said first and second sensor arrangements measure at different measurement frequencies, the second sensor arrangement measuring less frequently than the first sensor arrangement.

23. The flow sensor device according to claim 13, wherein said second position is in a dead volume, said second position being such that said fluid is static at said second position during intended measurements with said flow sensor device.

24. The flow sensor device according to claim 14, wherein
at least one of said flow sensor comprises a printed circuit
board, and
the first and second sensor arrangements are both
arranged on separate supports or on the same support.

\* \* \* \* \*